United States Patent [19]

Dick

[11] Patent Number: 4,613,775

[45] Date of Patent: Sep. 23, 1986

[54] APPARATUS OR METHOD FOR STABILIZING THE FREQUENCY OF A CLOCK SIGNAL GENERATED FROM AN ON-CHIP CLOCK GENERATOR

[75] Inventor: Carroll J. Dick, Dryden, N.Y.

[73] Assignee: International Business Machines Corporation, Armonk, N.Y.

[21] Appl. No.: 618,798

[22] Filed: Jun. 8, 1984

[51] Int. Cl.$^4$ .................. H03K 19/00; H03L 7/00
[52] U.S. Cl. .................................. 307/480; 307/479; 307/269; 307/271; 307/518; 328/109; 328/63
[58] Field of Search ............... 307/480, 479, 269, 271, 307/262, 528, 511, 518, 522; 328/63, 72, 109, 155, 34

[56] References Cited

U.S. PATENT DOCUMENTS 3,027,468  3/1962  Hill et al. ...................... 307/480
3,593,158  7/1971  Day et al. ...................... 328/55
3,792,362  2/1974  Grant ............................. 328/72
3,904,894  9/1975  Ciolli ............................. 307/260

FOREIGN PATENT DOCUMENTS 201123  11/1983  Japan .

Primary Examiner—Stanley D. Miller
Assistant Examiner—Richard Roseen
Attorney, Agent, or Firm—John H. Bouchard

[57] ABSTRACT

An on-chip clock signal generator circuit is disclosed. The clock signal generator generates a high frequency clock signal in response to a system clock developed from a source located at a point external to the chip. The clock generator circuit includes an apparatus for stabilizing the frequency of the clock signal generated by the clock signal generator, this apparatus stabilizing the frequency of the clock signal by minimizing the variation in the position of the intermediate pulses which comprise the clock signal.

5 Claims, 5 Drawing Figures

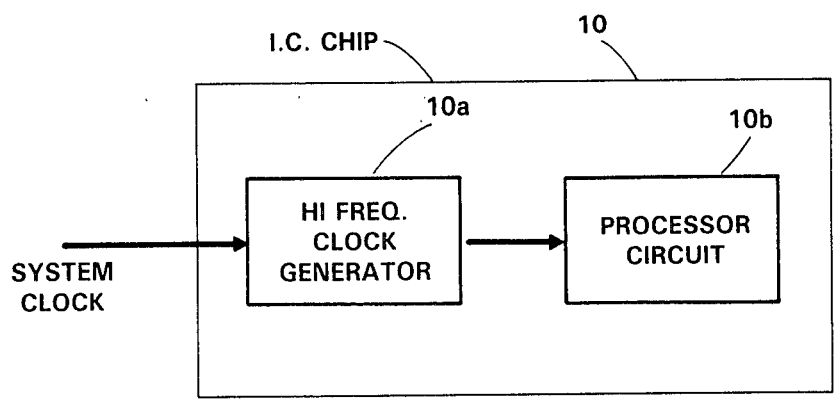
FIGURE 1
PRIOR ART
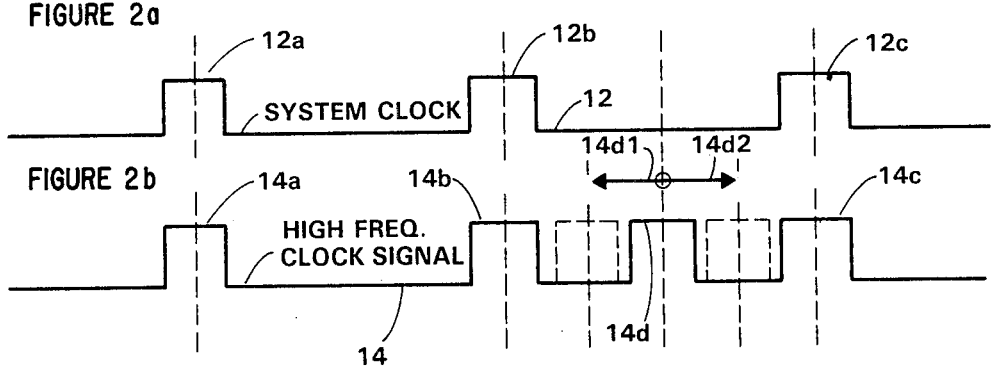

APPARATUS OR METHOD FOR STABILIZING THE FREQUENCY OF A CLOCK SIGNAL GENERATED FROM AN ON-CHIP CLOCK GENERATOR

BACKGROUND OF THE INVENTION

1. Field of the Invention

The present invention pertains to an improved on-chip clock signal generator circuit, and more particularly, to an apparatus within said clock signal generator circuit for stabilizing the frequency of the clock signal generated from the clock signal generator circuit.

2. Description of the Prior Art

Some integrated circuit chips used in association with modern day computing systems include a clock signal generator circuit for generating a high frequency clock signal in response to a system clock signal generated from a source disposed external to the chip. The high frequency clock signal is used to coordinate the functioning of various circuits disposed on the chip, such as a processor circuit. The clock signal generator generates a first pulse when a first pulse of the system clock is received. It generates a second pulse when a second pulse of the system clock is received. However, the clock signal generator also generates an intermediate pulse disposed between the generated first and second pulses.

Due to the particular characteristics of the clock signal generator circuit, the frequency of the high frequency clock signal is not fixed. The position of the intermediate pulses within the high frequency clock signal varies. The position of the first and second pulses within the high frequency clock signal does not vary since these pulses are generated in response to the system clock.

Computing systems of the prior art are not as fast, in terms of operating speed, as are modern day computing systems. Consequently, the non-fixed frequency of the high frequency clock signal did not detrimentally affect the performance of the prior art computing system. However, due to their faster operating speeds, the non-fixed frequency of the high frequency clock signal does detrimentally affect the performance of a modern-day computing systems. In particular, the operational performance of the various circuits on the chip, such as the processor circuit, is detrimentally affected. Accordingly, an apparatus within the clock signal generator circuit is needed to stabilize the frequency of the high frequency clock signal generated from the clock signal generator.

SUMMARY OF THE INVENTION

Accordingly, it is a primary object of the present invention to provide an on-chip clock signal generator circuit which includes an apparatus for stabilizing the frequency of a clock signal generated by the clock signal generator.

It is a further object of the present invention to provide an on-chip clock signal generator circuit which includes an apparatus for stabilizing the frequency of the clock signal generated by the clock signal generator, the apparatus stabilizing the frequency of the clock signal by minimizing the variation in the position of the intermediate pulses which comprise the clock signal.

These and other objects of the present invention are accomplished by designing a clock signal generator including a preliminary delay line for receiving a first pulse and a second pulse, the preliminary delay line developing output signals indicative of the position of the first pulse and the second pulse in the preliminary delay line, the clock signal generator further including an apparatus which comprises an additional delay line, a position determining means connected to the additional delay line for receiving the first pulse, determining the position of the first pulse in the additional delay line and generating output signals indicative of the position, and a means for generating an intermediate pulse by receiving the output signals from the position determining means indicative of the position of the first pulse in the additional delay line and the output signals from the preliminary delay line indicative of the position of the second pulse in the preliminary delay line and by generating a first pulse at a later point in time if the first pulse is not subject to appreciable delay in the preliminary or additional delay lines or a first pulse at an earlier point in time if the first pulse is subject to appreciable delay in the preliminary and additional delay lines in response to the receipt of the first pulse from the additional delay line and in accordance with the position of the second pulse in the preliminary delay line, the generated first pulse representing an intermediate pulse of the high frequency clock signal generated by the on-chip clock signal generator.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 1 illustrates an integrated circuit chip including a high frequency clock signal generator and a processor circuit connected to the high frequency clock signal generator;

FIGS. 2a and 2b illustrate a system clock signal and a high frequency clock signal generated by the high frequency clock generator of FIG. 1, respectively;

DETAILED DESCRIPTION OF THE PREFERRED EMBODIMENT

Figure 3:
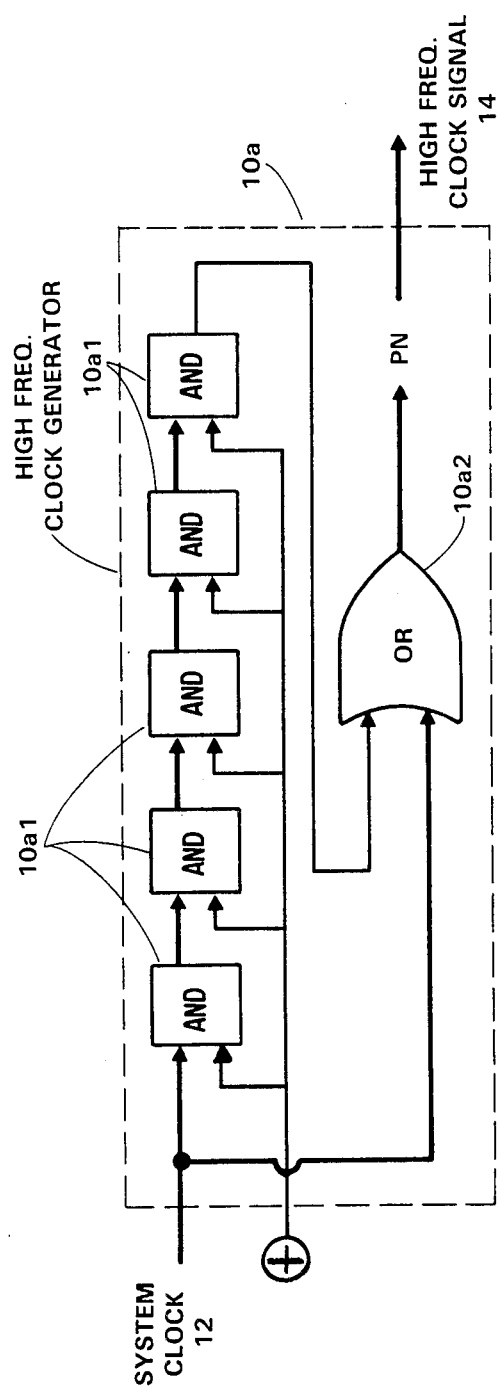
FIG. 3 illustrates a prior art frequency clock generator.

Referring to FIG. 1, an integrated circuit chip 10 is illustrated. The chip 10 includes a high frequency clock generator 10a and a processor circuit 10b connected to the output of the high frequency clock generator 10a. The high frequency clock generator 10a receives a system clock signal from a source external to the chip 10 and generates a high frequency clock signal in response to the system clock. The processor 10b receives the high frequency clock signal and utilizes this signal to perform its intended function.

Referring to FIG. 2a, a typical system clock signal 12 is illustrated. Referring to FIG. 2b, a typical high frequency clock signal 14 is also illustrated. The system clock of FIG. 2a includes a first pulse 12a, a second pulse 12b, and a third pulse 12c. The high frequency clock signal of FIG. 2b also includes a first pulse 14a, a second pulse 14b, and a third pulse 14c. However, the high frequency clock signal further includes an intermediate pulse 14d.

The high frequency clock generator 10a of the prior art, as shown in FIG. 1, generated a high frequency clock signal with a varying frequency. The frequency varied because the position of the intermediate pulse 14d within the high frequency clock signal 14 would not remain fixed. The intermediate pulse 14d would move from its intended mid-point to a point located either to the left or to the right of the mid-point, as indicated by the arrows 14d1 and 14d2. Consequently, the functioning of the processor 10b on chip 10 was detrimentally affected.

Referring to FIG. 3, a detailed construction of a high frequency clock generator 10a of the prior art is illustrated. The high frequency clock generator 10a of FIG. 3 generates the high frequency clock signal 14 shown in FIG. 2b, including the moving intermediate pulse 14d which causes the frequency of the high frequency clock signal 14 to vary. In FIG. 3, the high frequency clock generator comprises a plurality of AND gates 10a1 connected together. The first AND gate 10a1 receives the system clock signal 12 at one of its input terminals and a high (binary 1) signal at its other input terminal. The high (binary 1) signal is tied to the other input terminal of each of the other AND gates 10a1 shown in FIG. 3. The output terminal of the first AND gate 10a1 is connected to the one input terminal of the second AND gate 10a1; the output terminal of the second AND gate 10a1 is connected to the one input terminal of the third AND gate 10a1; the output terminal of the third and fourth AND gates 10a1 are connected to the one input terminal of the fourth and fifth AND gates 10a1, respectively. The output terminal of the fifth AND gate 10a1 is connected to one input terminal of an OR gate 10a2. The other input terminal of the OR gate 10a2 is connected directly to the system clock. The output signal generated by the OR gate 10a2 represents the high frequency clock signal 14 shown in FIG. 2b.

In operation, the high frequency clock generator 10a of the prior art shown in FIG. 3, functions in the following manner. Each of the AND gates 10a1 represent a delay element in that each AND gate 10a1 includes an inherent amount of delay. However, the amount of delay inherent in an AND gate 10a1 depends upon a variety of factors peculiar to the AND gate. Suffice it to say, however, that the amount of delay for each AND gate 10a1 varies, from one point in time to another.

When the first pulse 12a of the system clock is generated, the first pulse 12a is received by the other input terminal of OR gate 10a2 and is propagated directly therethrough thereby generating the first pulse 14a of the high frequency clock signal. However, at the same time, the first pulse 12a of the system clock is propagated through the plurality of AND gates 10a1 to the one input terminal of the OR gate 10a2. Since the amount of delay inherent in the AND gates 10a1 varies, the first pulse 12a may be received by the one input terminal of the OR gate 10a2 at an earlier point in time or at a later point in time. Therefore, when an intermediate pulse is generated, it may or may not be generated by the OR gate 10a2 at a point mid-way between the first pulse 14a and the second pulse 14b of the high frequency clock signal. Utilizing second and third pulses 12b, 14b, 12c, 14c of FIG. 2a and 2b, intermediate pulse 14d may be generated at an earlier point in time or at a later point in time, as indicated by arrows 14d1 and 14d2. When the second and third pulses 12b and 12c of the system clock are received by the high frequency clock generator 10a, they are propagated directly through the OR gate 10a2 to the output of the high frequency clock generator 10a yielding pulses 14b and 14c, that is, since the other input terminal of the OR gate 10a2 is connected directly to the source of the system clock, the second and third pulses 14b and 14c of the high frequency clock signal will be generated immediately in response to the second and third pulses 12b and 12c of the system clock. However, since the generation of the intermediate pulses 14d of the high frequency clock signal is dependant upon the characteristics of the delay elements (AND gates 10a1) shown in FIG. 3, the intermediate pulse 14d may or may not be generated at a point which is mid-way between the second pulse 14b and the third pulse 14c of the high frequency clock signal 14. Therefore, the frequency of the high frequency clock signal 14 is not fixed with respect to the embodiment of the high frequency clock generator 10a shown in FIG. 3. Therefore, the functioning of the processor circuit 10b shown in FIG. 1 may be detrimentally affected. In order to remedy this deficiency, another embodiment of the high frequency clock generator 10a shown in FIG. 1 is required.

Figure 4:
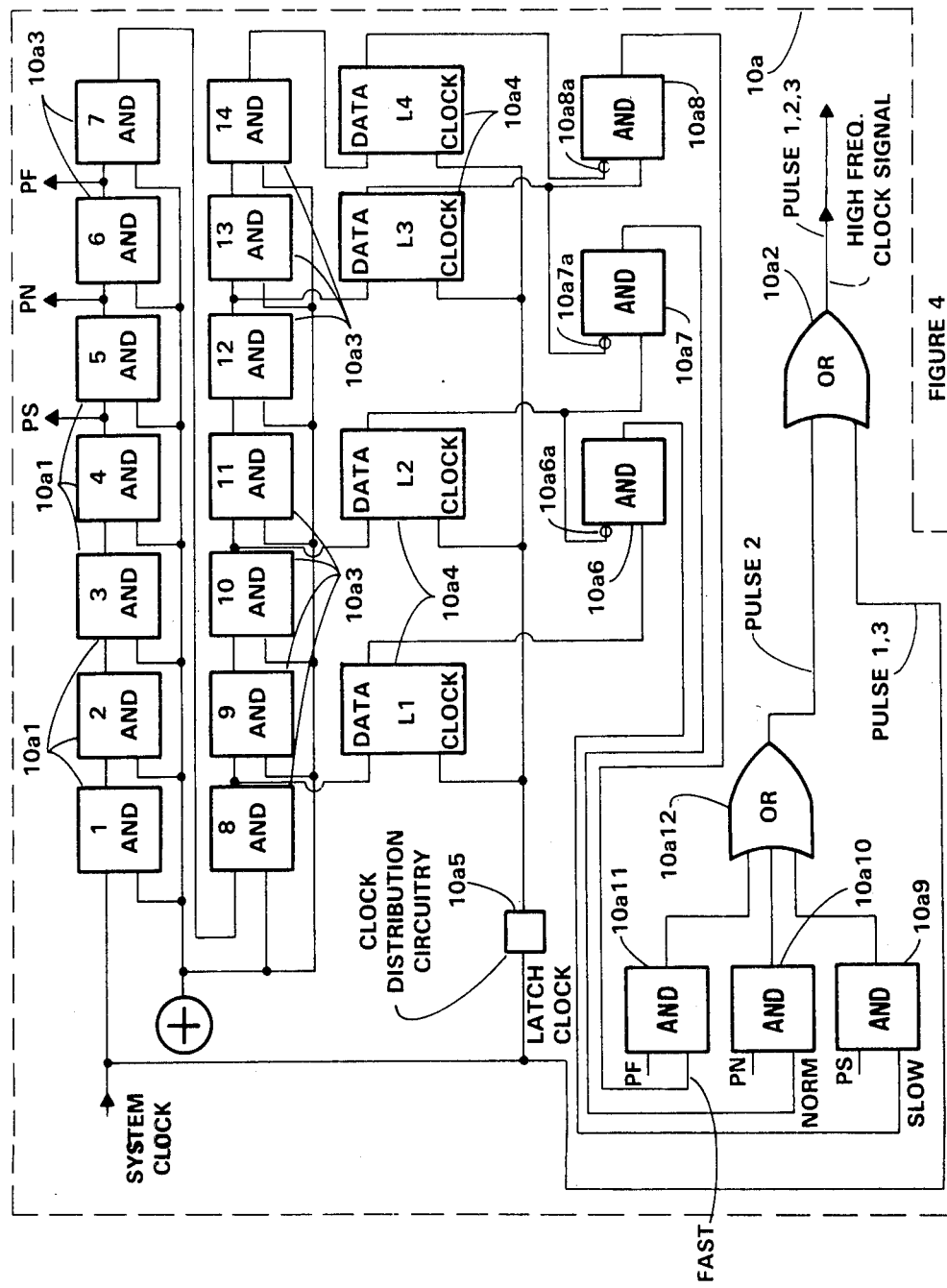
FIG. 4 illustrates the high frequency clock generator in accordance with the present invention.

Referring to FIG. 4, a high frequency clock signal generator 10a, in accordance with the present invention, is illustrated. In FIG. 4, the plurality of AND gates 10a1, as shown in FIG. 3, is again illustrated. However, a second plurality of AND gates 10a3 is serially connected to the output of the original plurality of AND gates 10a1. The original plurality of AND gates 10a1 may be alternatively referred to as a preliminary delay line and the second plurality of AND gates 10a3 may be alternatively referred to as an additional delay line. For convenience of description, the AND gates 10a1 and 10a3 have been numbered sequentially from 1 to 14. In FIG. 4, AND gates 1 through 14 are connected serially together. One output terminal is disposed between AND gates 4 and 5 and is labelled Ps. Another output terminal is disposed between AND gates 5 and 6 and is labelled Pn. Another output terminal is disposed between AND gates 6 and 7 and is labelled Pf. With the exception of AND gate 14, the output terminal of each AND gate is connected to one input terminal of the next sequentially connected AND gate. The one input terminal of AND gate 1 is connected to the system clock. The other input terminal of each AND gate (1–14) is connected to a high (binary 1) input signal source.

A plurality of latch circuits 10a4, consisting of latches L1, L2, L3, and L4, are connected to the output terminals of AND gates 8, 10, 12, and 14, respectively. For example, the data terminal of a latch circuit L1 is connected to the output terminal of AND gate 8. The data terminal of a latch circuit L2 is connected to the output terminal of AND gate 10. The data terminal of a latch circuit L3 is connected to the output terminal of AND gate 12. The data terminal of a latch circuit L4 is connected to the output terminal of AND gate 14. The clock terminal of latches L1, L2, L3, and L4 is connected to the system clock 12 via a clock distribution circuit 10a5. The output terminal of latch circuit L2 is connected to one input terminal of AND gate 10a6 via an inverter 10a6(a). The output terminal of latch circuit L1 is connected to the other input terminal of AND gate 10a6. The output terminal of latch circuit L3 is connected to one input terminal of AND gate 10a7 via an inverter 10a7(a). The other input terminal of AND gate 10a7 is connected to the output terminal of latch circuit L2. The output terminal of latch circuit L4 is connected to one input terminal of AND gate 10a8 via an inverter 10a8(a). The other input terminal of AND gate 10a8 is connected to the output terminal of latch circuit L3. An AND gate 10a9 includes one input terminal connected to the Ps output terminal and another input terminal connected to the output terminal of AND gate 10a6. An AND gate 10a10 includes one input terminal connected to the Pn output terminal and another input terminal connected to the output terminal of and gate 10a7. An AND gate 10a11 includes one input terminal connected to the Pf output terminal and another input terminal connected to the output terminal of and gate 10a8. The output terminals of AND gates 10a9, 10a10, and 10a11 are connected to respective input terminals of an OR gate 10a12. The output terminal of OR gate 10a12 is connected to one input terminal of OR gate 10a2. The other input terminal of OR gate 10a2 is connected directly to the system clock. The output terminal of OR gate 10a2 provides the high frequency clock signal shown in FIG. 2b; however, the position of the intermediate pulses 14d in this clock signal is more nearly fixed. Therefore, its frequency is also more nearly fixed.

Figure 5:
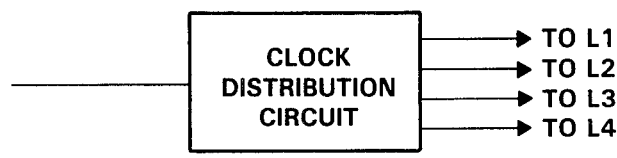
FIG. 5 illustrates the clock distribution circuitry of FIG. 4.

The clock distribution circuit 10a5 of FIG. 4 is illustrated again in FIG. 5 of the drawings. The clock distribution circuit 10a5 receives a system clock pulse and generates a plurality of pulses in response thereto, each of which is approximately identical to the system clock pulse which energized the clock distribution circuit.

The functional operation of the high frequency clock signal generator 10a, according to the present invention, will be described in the paragraphs below with reference to FIGS. 2a, 2b, and 4 of the drawings.

In FIG. 4, system clock pulses 12a, 12b, and 12c of FIG. 2a and 2b are allowed to propagate through the chain of delay elements consisting of a plurality of AND gates 10a1 and 10a3. As previously mentioned, each AND gate 10a1 and 10a3 possesses a certain delay in that a signal propagating therethrough will be delayed by an amount corresponding to the certain delay. However, the amount of delay associated with each AND gate varies from one point in time to another depending upon a variety of factors. In FIG. 4, it is assumed that the total delay associated with the plurality of AND gates 10a1 and 10a3 is greater than the cycle time (i.e.—the period) of the system clock. For the purposes of this discussion, a half-cycle delay is desired, that is, it is desired that the intermediate pulses of the high frequency clock signal be disposed at a mid-point between adjacent pulses of the high frequency clock signal.

Assume that the AND gates 10a1 and 10a3 are operating slowly, that is, a significant amount of delay is attributable to each AND gate. The first pusle 12a of the system clock begins to propagate through the chain of AND gates 10a1 and 10a3. At some point in time during the propagation of the first pulse 12a through the chain of AND gates, the second pulse 12b of the system clock begins to propagate through the chain of AND gates 10a1 and 10a3. When the first pulse 12a of the system clock is generated, the other input terminal of OR gate 10a2 is energized and the first pulse 12a is propagated through OR gate 10a2 representing the first pulse 14a of the high frequency clock signal. When the second pulse 12b of the system clock is generated, the other input terminal of OR gate 10a2 is energized and the second pulse 12b is propagated through OR gate 10a2 representing the second pulse 14b of the high frequency clock signal.

Utilizing the assumption that the AND gates 10a1 and 10a3 are operating slowly, if the first pulse 12a of the system clock has not yet sufficiently propagated through the chain of AND gates 10a3, the first pulse 12a of the system clock may have energized the data terminal of latch L1 of latches 10a4 simultaneously with the energization of the clock terminal of latch L1 by the second ulse 12b of the system clock. When this occurs, the output of latch L1 will be high (binary 1). However, since the first pulse 12a of the system clock has not energized the data terminal of latches L2, L3, and L4, the output of latches L2, L3, and L4 is low (binary 0). Since the output of latch L1 is high and the output of latch L2 is low, due to the functioning of inverter 10a6(a), the output of AND gate 10a6 will be high but the outputs of AND gates 10a7 and 10a8 will be low. Consequently, the input terminal to AND gate 10a9 marked "slow" will be high, but the input terminals to AND gates 10a10 and 10a11 marked "nom" and "fast" will be low. When the second pulse 12b of the system clock, propagating through the chain of AND gates 10a1, arrives at the output of AND gate 4 of AND gates 10a1, the Ps output terminal goes high (binary 1). Therefore, the input terminal to AND gate 10a9 markes "Ps" will also be high. The input terminal to AND gate 10a9 marked "Ps" will be high when the input terminal to AND gate 10a9 marked "slow" is also high. Therefore, AND gate 10a9 will develop an output signal; however, AND gates 10a10 and 10a11 will not be developing output signals therefrom. The output signal from AND gate 10a9 will propagate through OR gate 10a12 representing an intermediate pulse 14d, this intermediate pulse being disposed aproximately mid-way between the second pulse 12b of the system clock and a third pulse of the system clock 12c. Even though the AND gates 10a1 and 10a3 are operating slowly, causing an appreciable amount of delay for the intermediate pulse as it propagates through the chain of AND gates 10a1 and 10a3, the position of latch circuit L1 near the front end of AND gates 10a3 coupled with the early receipt of output signal Ps by AND gate 10a9 will cause the intermediate pulse 14d to be disposed near a mid-point between the second pulse 12b and a third pulse 12c of the system clock.

Assume that the AND gates 10a1 and 10a3 are operating fast, that is, a small amount of delay is attributable to each AND gate. The first pulse 12a of the system clock begins to propagate rapidly through the chain of AND gates 10a1 and 10a3. At some point in time during the propagation of the first pulse 12a through the chain of AND gates, the second pulse 12b of the system clock begins to propagate rapidly through the chain of AND gates 10a1 and 10a3. When the first pulse 12a of the system clock is generated, the other input terminal of OR gate 10a2 is energized and the first pulse 12a is propagated through OR gate 10a2 representing the first pulse 14a of the high frequency clock signal. When the second pulse 12b of the system clock is generated, the other input terminal of OR gate 10a2 is energized and the second pulse 12b is propagated through OR gate 10a2 representing the second pulse 14b of the high frequency clock signal.

Utilizing the assumption that the AND gates 10a1 and 10a3 are operating fast, if the first pulse 12a of the system clock has propagated through the chain of AND gates 10a3, the first pulse 12a of the system clock may have energized the data terminal of latches L1, L2, and L3 simultaneously with the energization of the clock terminal of latches L1, L2, and L3, respectively, by the second pulse 12b of the system clock, causing the outputs of latches L1, L2, and L3 to go high (binary 1). If the first pulse 12a has not yet propagated through the chain of AND gates 10a3 to energize the data terminal of latch L4, the output of latches L1, L2, and L3 will be high (binary 1) but the output of latch L4 will be low (binary 0). Since the output of latches L1, L2, and L3 are high and the output of latch L4 is low, due to the functioning of inverter 10a8(a), the output of AND gate 10a8 will be high but the outputs of AND gates 10a6 and 10a7 will be low. Consequently, the input terminal to AND gate 10a11 marked "fast" will be high, but the input terminals to AND gates 10a9 and 10a10 marked "slow" and "nom" will be low. Since the AND gates 10a1 are operating fast, the output terminal "Pf" will be high when the input terminal to AND gate 10a11 marked "fast" is also high. Therefore, AND gate 10a11 will develop an output signal; however, AND gates 10a9 and 10a10 will not be developing output signals therefrom. The output signal from AND gate 10a11 will propagate through OR gate 10a12 and 10a2 representing an intermediate pulse 14d, this intermediate pulse being disposed between the second pulse 12b of the system clock and a third pulse 12c of the system clock. Even though the AND gates 10a1 and 10a3 are operating fast, causing a small amount of delay for the intermediate pulse as it propagates through the chain of AND gates 10a1 and 10a3, the position of latch circuit L4 near the back end of AND gates 10a3 coupled with the late receipt of output signal Pf by AND gate 10a11 will cause the intermediate pulse 14d to be disposed near a mid-point between the second pulse 12b and a third pulse 12c of the system clock.

This process will repeat itself with respect to the intermediate pulse of the high frequency clock signal disposed between the third and fourth pulses of the system clock, with respect to the intermediate pulse disposed between the fourth and fifth pulses of the system clock, et cetera. Since the intermediate pulses of the high frequency clock signal are disposed near a mid-point between the adjacent pulses of the system clock, the frequency of the high frequency clock signal is more nearly fixed. The functioning of the processor circuit 10b and other circuits on the chip are not detrimentally affected. Higher speed computing systems, using this high frequency clock signal, will perform effectively due to the fixed frequency of the clock signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A clock signal generator circuit for developing a clock signal having a certain frequency in response to a system clock received from a system clock generating means, the system clock including a plurality of pulses which further includes a first pulse, a second pulse, and a third pulse, comprising:
   preliminary delay line means responsive to the pulses of the system clock signal for developing output signals, the pulses of the system clock having a location within said delay line means during the propagation of said pulses therethrough, said output signals of said preliminary delay line means being indicative of the location of the first, second, and third pulse of said pulses within said delay line means during the propagation of the pulses therethrough, the preliminary delay line means determining the location of the second pulse of the system clock propagating within the preliminary delay line means and developing a second subset output signal indicative of said location of the second pulse; and
   means conected to the preliminary delay line means and responsive to the output signals developed therefrom for stabilizing the frequency of the clock signal generated by the clock signal generator circuit, the clock signal including a plurality of primary pulses generated immediately in response to the pulses of the system clock and a plurality of additional intermediate pulses disposed, respectively, between adjacent ones of the plurality of primary pulses, the intermediate pulses having a position between adjacent primary pulses and varying in said position between adjacent primary pulses, the means for stabilizing minimizing the variation in the position of the intermediate pulses disposed between adjacent primary pulses of the clock signal.

2. The clock signal generator circuit of claim 1, wherein the means for stabilizing comprises:
   additional delay line means connected serially to said preliminary delay line means,
   position determining means connected to said additional delay line means for determining the position of the first pulse of the system clock within the additional delay line means and for generating output signals indicative of said position,
   intermediate pulse generating means responsive to the second subset output signal from the preliminary delayline means and to the output signals from the position determining means for generating an intermediate pulse in response thereto, the intermediate pulse being generated at a point in time approximately mid-way between adjacent pulses of the system clock, and
   receiving means connected to the intermediate pulse generating means and to the system clock generating means for receiving the first, second, and third pulses of the system clock from the system clock generating means and for generating first, second, and fourth pulses, respectively, of the clock signal in response thereto, the receiving means receiving the intermediate pulse from the intermediate pulse generating means and generating a third pulse of the clock signal in response thereto,
   whereby the third pulse of the clock signal is positioned approximately mid-way between the second pulse and the furth pulse of the clock signal thereby fixing the frequency of the clock signal being subsequently generated from the clock signal generator.

3. The clock signal generator circuit of claim 2, wherein said position determining means comprise:
   a plurality of latch circuits, each of said latch circuits having a data input terminal, a clock input terminal, and an output terminal, the data input terminals of said latch circuits being connected to said additional delay line means, the clock input terminals being connected to said system clock; and
   a plurality of AND gates having input terminals connected to the output terminals of said latch circuits, said plurality of AND gates having output terminals for developing said output signals from said position determining means.

4. The clock signal generator circuit of claim 3, wherein said intermediate pulse generating means comprise:
   a further plurality of AND gates having input terminals connected to the output terminals of said plurality of AND gates and responsive to said output signals of said preliminary delay line means, said further plurality of AND gates having output terminals; and
   OR gate means having an input terminal connected to the output terminals of said further plurality of AND gates for generating said intermediate pulse at a point in time approximately mid-way between adjacent primary pulses of the system clock.

5. A method of stabilizing the frequency of a clock signal generated from a clock signal generator, comprising the steps of:
   generating a first pulse of a system clock;
   propagating said first pulse of said system clock through a delay line of said clock signal generator;
   during the propagation of said first pulse of said system clock through said delay line, receiving said first pulse of said system clock independently of said delay line and generating a first pulse of said clock signal in response thereto;
   generating a second pulse of said system clock;
   propagating said second pulse of said system clock through said delay line of said clock signal generator;
   during the propagation of said second pulse of said system clock through said delay line, receiving said second pulse of said system clock independently of said delay line and generating a second pulse of said clock signal in response thereto; and
   receiving said first pulse of said system clock from said delay line and said second pulse of said system clock from said delay line and generating a third pulse of said clock signal in response thereto, said third pulse of said clock signal being positioned approximately mid-way between said second pulse of said clock signal and a fourth pulse of said clock signal.

* * * * *